US008550364B2

(12) United States Patent
Sugimoto et al.

(10) Patent No.: US 8,550,364 B2
(45) Date of Patent: Oct. 8, 2013

(54) CARD KEY HAVING FUNCTION OF PERFORMING RADIO COMMUNICATION WITH ON-VEHICLE DEVICE

(75) Inventors: Keiichi Sugimoto, Kariya (JP); Mitsuru Nakagawa, Chiryu (JP)

(73) Assignee: Denso Corporation, Kariya (JP)

( * ) Notice: Subject to any disclaimer, the term of this patent is extended or adjusted under 35 U.S.C. 154(b) by 58 days.

(21) Appl. No.: 13/135,650

(22) Filed: Jul. 12, 2011

(65) Prior Publication Data

US 2012/0012659 A1 Jan. 19, 2012

(30) Foreign Application Priority Data

Jul. 13, 2010 (JP) ................................ 2010-158736
Jun. 14, 2011 (JP) ................................ 2011-132310

(51) Int. Cl.

| | |
|---|---|
| ***G08B 13/14*** | (2006.01) |
| ***B60R 25/10*** | (2013.01) |
| ***B60R 25/00*** | (2013.01) |
| ***G05B 19/00*** | (2006.01) |
| ***G06K 19/06*** | (2006.01) |
| ***G06K 19/00*** | (2006.01) |
| ***G06K 5/00*** | (2006.01) |

(52) U.S. Cl.
USPC ........... 235/492; 235/493; 235/380; 235/382; 235/487; 340/5.6; 340/5.72; 340/572.1; 340/426.16

(58) Field of Classification Search
USPC .......... 235/487, 492, 493, 380, 382; 340/5.6, 340/572.1, 426.16, 5.72
See application file for complete search history.

(56) References Cited

U.S. PATENT DOCUMENTS 5,244,840 A * 9/1993 Kodai et al. .................... 29/841
5,438,750 A * 8/1995 Venambre ...................... 29/829
5,923,026 A * 7/1999 Onoda ......................... 235/492
6,050,118 A * 4/2000 Kito ........................... 70/456 R
6,548,888 B1 * 4/2003 Fidalgo et al. ................ 257/679
6,988,668 B2 * 1/2006 Osako et al. .................. 235/492
7,098,791 B2 * 8/2006 Okada ......................... 340/568.1
7,375,975 B1 * 5/2008 Jang et al. ................... 361/752
7,463,134 B1 * 12/2008 Stilley ....................... 340/5.61
7,686,228 B2 * 3/2010 Oddou et al. .................. 235/492
8,223,500 B2 * 7/2012 Yamada et al. ................. 361/737
2001/0025888 A1 * 10/2001 Kakinoki ................... 235/492

(Continued)

FOREIGN PATENT DOCUMENTS

JP 63-184674 7/1988
JP 07-317394 12/1995

(Continued)

*Primary Examiner* — Daniel Walsh
(74) *Attorney, Agent, or Firm* — Harness, Dickey & Pierce, PLC

(57) ABSTRACT

A card key includes a circuit board and a plate-shaped key body. The circuit board is mounted with electronic parts that configure an electronic circuit for performing radio communication with an on-vehicle device. The key body is mounted with the circuit board which is covered with a resin material. The key body has a principal front surface on the side of which the electronic parts are mounted, and has a main body recess sunk to a predetermined depth level from the principal front surface and a key component accommodating recess further sunk to a level deeper than the main body recess and opened in a bottom surface of the main body recess. The key body forms an outline of the card key together with a sheet body fitted to the main body recess. The key component accommodating portion is formed between the sheet body and the key component accommodating recess.

13 Claims, 8 Drawing Sheets

(56) References Cited

U.S. PATENT DOCUMENTS

| | | | | |
|---|---|---|---|---|
| 2003/0222755 | A1* | 12/2003 | Kemper et al. | 340/5.61 |
| 2004/0185798 | A1* | 9/2004 | Ohtaki et al. | 455/90.3 |
| 2004/0201512 | A1* | 10/2004 | Sugimoto et al. | 341/176 |
| 2005/0001039 | A1* | 1/2005 | Oddou et al. | 235/492 |
| 2005/0030243 | A1* | 2/2005 | Ohara et al. | 343/788 |
| 2006/0054711 | A1* | 3/2006 | Osako et al. | 235/492 |
| 2006/0245170 | A1* | 11/2006 | Sugimoto et al. | 361/740 |
| 2008/0041964 | A1* | 2/2008 | Chin et al. | 235/492 |
| 2009/0115611 | A1* | 5/2009 | Kobayashi et al. | 340/572.1 |
| 2011/0220474 | A1* | 9/2011 | Dimig | 200/239 |
| 2012/0012659 | A1* | 1/2012 | Sugimoto et al. | 235/492 |
| 2012/0037710 | A1* | 2/2012 | Le Garrec et al. | 235/492 |
| 2012/0055999 | A1* | 3/2012 | Le Garrec et al. | 235/492 |
| 2012/0248201 | A1* | 10/2012 | Sutera | 235/492 |
| 2013/0039024 | A1* | 2/2013 | Sugimoto et al. | 361/757 |
| 2013/0119146 | A1* | 5/2013 | Sugimoto et al. | 235/492 |

FOREIGN PATENT DOCUMENTS

| | | |
|---|---|---|
| JP | 11-172974 | 6/1999 |
| JP | 2002-291079 | 10/2002 |
| JP | 2003-8253 | 1/2003 |
| JP | 2003-304169 | 10/2003 |
| JP | 2004-068417 | 3/2004 |
| JP | 2004-79796 | 3/2004 |
| JP | 2004-134835 | 4/2004 |
| JP | 2004-241476 | 8/2004 |
| JP | 2005-054368 | 3/2005 |
| JP | 2006-307504 | 11/2006 |
| JP | 2007-74527 | 3/2007 |
| JP | 2007-224664 | 9/2007 |
| JP | 2007-227246 | 9/2007 |
| JP | 2007-285093 | 11/2007 |
| JP | 2008-068674 | 3/2008 |

* cited by examiner

CARD KEY HAVING FUNCTION OF PERFORMING RADIO COMMUNICATION WITH ON-VEHICLE DEVICE

CROSS-REFERENCE TO RELATED APPLICATION

This application is based on and claims the benefit of priorities from earlier Japanese Patent Application Nos. 2010-158736 and 2011-132310 filed Jul. 13, 2010 and Jun. 14, 2011, respectively, the descriptions of which are incorporated herein by reference.

BACKGROUND OF THE INVENTION

1. Technical Field of the Invention

The present invention relates to a card key having a function as an electronic key and having a shape of a credit card, and in particular to a handheld card key favorable for use for vehicles.

2. Related Art

Recently, handheld electronic keys (categorized as handheld devices) have come to be available for locking or unlocking vehicle doors and/or starting engines. For example, in response to a query signal from an on-vehicle device, such an electronic key functions by transmitting an ID code specific to the vehicle to the on-vehicle device, and after verification of the ID code, automatically allows locking or unlocking of the vehicle doors subject to matching of the ID code, or allows startup of the engine.

For example, this type of electronic key is disclosed in patent documents JP-A-2007-224664, JP-A-2007-227246, JP-A-2004-134835, JP-A-2004-079796, JP-A-H07-317394 and JP-A-2004-241476. As disclose in these patent documents, an electronic key in general is configured to have a casing in which a circuit board and a battery are accommodated and hermetically enclosed using a cover. However, such a configuration necessitates an electronic key to have a large thickness and gives insufficient usability such as in carrying the electronic key. Thus, an electronic key having good usability and having a shape of a credit card (hereinafter referred to as "card key") has been desired.

As shown in FIGS. 1 to 4, for example, in the above card key, a circuit board 101 is integrally covered with a resin material 104 for formation into a shape of a plate. The circuit board 101 is mounted with electronic parts 102 that perform radio communication with an on-vehicle device. This card key 100 is provided with a battery accommodating hole 104*a* having a closed cross section for accommodating a battery 105, and a key accommodating hole 104*b* having a closed cross section for accommodating a mechanical key 106. Also, a logo 107 of a vehicle maker is attached to the card key 100.

For example, as shown in FIG. 3, the card key 100 described above is manufactured by injection molding of a resin using a die 200. The die 200 includes a lower die 201 (core plate), an upper die 202 (cavity plate) and a slide core 203 (bush). The slide core 203 is moved rightward, as viewed in FIG. 3, passing between battery terminals 103, 103 to form the battery accommodating hole 104*a*. Although not shown, the die 200 also includes a slide core for forming the key accommodating hole 104*b*. This slide core is moved leftward, as viewed in FIG. 3, to form the key accommodating hole 104*b*.

In this way, in the conventional art, the slide core 203 and the like have been used to form the battery accommodating hole 104*a* and the key accommodating hole 104*b*. For this reason, the structure of the die 200 has been unavoidably complicated, and thus, as the card key 100 becomes thinner, more manufacturing cost has been incurred. When the card key 100 is formed into a thin shape using the die 200, only a uniform design (appearance design) has been available, and thus it has been difficult to provide a variety of aesthetic designs.

SUMMARY

Hence it is desired to provide a card key incurring low manufacturing cost but enabling a variety of appearance designs and individualities.

An exemplary embodiment provides a card key, i.e. a handheld electronic key having a shape of a credit card, includes a circuit board mounted with electronic parts that configure an electronic circuit for performing radio communication with an on-vehicle device; and the key body has a principal front surface on the side of which the electronic parts are mounted, the key body being provided with a main body recess sinking to a predetermined depth level from the principal front surface, and a key component accommodating recess further sinking to a level deeper than the main body recess and opened in a bottom surface of the main body recess; the key body forms an outline of the card key together with a sheet body fitted to the main body recess for coverage of the main recess; and a key component accommodating portion having a closed cross section is formed between the sheet body and the key component accommodating recess, for accommodation of a key component.

Also, a further exemplary embodiment provides a card key similar to the one mentioned above, in which the key body is formed by die-opening/closing motion of a die having a double-plate structure consisting of a core plate and a cavity plate; the main body recess is formed at the time of insert molding using the die, in a principal front surface on the side of which the electronic parts are mounted, the main body recess being formed such that the electronic parts are not exposed outside; and a sheet body having an exterior appearance different from the resin material can be fitted to the main body recess after insert molding.

The card key can dispense with slide cores of conventional art for forming a battery accommodating hole and a key accommodating hole having a closed cross section. Thus, the manufacturing cost of the card key is reduced to a large degree. Specifically, the key component accommodating recess is formed using a main die (upper die and lower die), while the sheet body is covered over the main body recess in which the key component accommodating recess is opened. In this way, a key component accommodating portion having a closed cross section can be formed. Moreover, a plurality of types of sheet bodies having different color and print (design) may be prepared. Accordingly, a sheet body having a print of a user's favorite can be fixed to the main body recess. Thus, a card key is realized, enabling a variety of appearance designs and individualities.

In this case, the circuit board is embedded at a depth level that does not allow the circuit board to be exposed to the bottom surface of the key component accommodating recess. Meanwhile, the electronic parts are embedded at a depth level that does not allow the electronic parts to be exposed to the bottom surface of the main body recess. Thus, when an electronic part having a thickness of some extent is mounted on the circuit board, the position of mounting the electronic part is set to a position corresponding to a position included in the main body recess and not coinciding with the position included in the key component accommodating recess. Thus, the key body is made as thin as possible.

In the card key, the key component accommodating recess is a battery accommodating recess that accommodates a battery for supplying electric power to the circuit board; and a battery accommodating portion is formed between the sheet body and the battery accommodating recess to restrict movement of the battery in a thickness direction of the key body.

Specifically, the key body is provided with a key accommodating recess that accommodates a manually operated mechanical key, the key accommodating recess being formed at the time insert molding of the key body and having a bottom surface at a depth level deeper than a bottom surface of the main body recess; and the key accommodating recess is covered with the sheet body to restrict movement of the mechanical key accommodated in the key accommodating recess, in a thickness direction of the key body.

Thus, the key body is provided with the battery accommodating recess having a bottom surface at a depth level deeper than the bottom surface of the main body recess. Accordingly, in the case where the battery accommodating recess is also formed using the die having a double-plate structure consisting of a core plate and a cavity plate at the time of insert molding of the key body with the die-opening/closing motion of the die, the slide core or the like dedicated to the formation of the battery accommodating recess is not required to be used. As a result, the work at the time of placing the circuit board on the die is simplified to thereby suppress the increase of the manufacturing cost of the key body.

In the card key, the key component accommodating recess is a key accommodating recess that accommodates a manually operated mechanical key; and a key accommodating portion is formed between the sheet body and the key accommodating recess to restrict movement of the mechanical key in a thickness direction of the key body.

Specifically, the key body is provided with a key accommodating recess that accommodates a manually operated mechanical key, the key accommodating recess being formed at the time insert molding of the key body and having a bottom surface at a depth level deeper than a bottom surface of the main body recess; and the key accommodating recess is covered with the sheet body to restrict movement of the mechanical key accommodated in the key accommodating recess, in a thickness direction of the key body.

Thus, the key body is provided with the key accommodating recess having a bottom surface at a depth level deeper than the bottom surface of the main body recess. Accordingly, similar to the battery accommodating recess, in the case where the key accommodating recess is also formed using the die having a double-plate structure consisting of a core plate and a cavity plate at the time of insert molding of the key body with the die-opening/closing motion of the die, the slide core or the like dedicated to the formation of the key accommodating recess is not required to be used. As a result, the work at the time of placing the circuit board on the die is simplified to thereby suppress the increase of the manufacturing cost of the key body.

In this case, the key body is provided with a hook accommodating recess for accommodating a key fixing hook which fixes the mechanical key to the key body by being engaged with an engaged portion formed in the mechanical key, the hook accommodating recess being formed further sinking to a depth level deeper than that of the main body recess, and being opened in a bottom surface of the main body recess; and a hook accommodating portion is formed between the sheet body and the hook accommodating recess to restrict movement of the key fixing hook in a thickness direction of the key body.

Specifically, the key body is provided with a hook accommodating recess that accommodates a key fixing hook which fixes the mechanical key to the key body by being engaged with an engaged portion formed in the mechanical key, the hook accommodating recess being formed at the time of insert molding together with the key accommodating recess.

The key accommodating recess and the hook accommodating recess have respective bottom surfaces located so as to be continuous at a depth level corresponding to the thickness of the mechanical key; the key fixing hook has a substantially U-shaped form and is located on a bottom surface of the hook accommodating recess, the key fixing hook being elastically deformed in a direction parallel to the bottom surface of the hook accommodating recess so that an interval in the U shape is narrowed in a state where the key fixing hook is disengaged from the engaged portion, compared to a state where the key fixing hook is engaged with the engaged portion.

Thus, a configuration in which a component for fixing the mechanical key to the key body is assembled to the inside of the mechanical key, is replaced by a configuration in which a key fixing hook for fixing the mechanical key to the key body is provided outside the mechanical key. Accordingly, the shape of both of the mechanical key and the key fixing hook can be simplified, whereby the manufacturing cost of the card key as a whole is favorably prevented from being increased.

On the other hand, the sheet body may have a front surface that enables printing. For example, it may be so configured that inkjet accepting ink that enables inkjet printing is printed on the front surface of the sheet body, so that a design prepared by a user is provided on the front surface by inkjet printing. Alternatively, the sheet body may have a front or rear surface on which a design prepared in advance is printed.

For example, a dealer associated with the marketing of the vehicle may prepare the sheet body on which an inkjet accepting ink is printed, and a user may print a design of the user's favorite on the sheet body using inkjet printing. In this way, an individual user's favorite design is introduced to the card key of the user. Alternatively, a dealer associated with the marketing of the vehicle may prepare in advance the sheet body on which various designs are printed. Thus, a user is able to choose a user's favorite design from the printed designs for introduction to the card key of the user.

In this way, an individual user is able to possess a card key having a specific quality. It is expected that this may contribute to the promotion of the vehicles for which such card keys are used.

The sheet body may be configured to be pasted through its rear surface onto the bottom surface of the main body recess via an adhesive. This may facilitate the work of mounting the sheet body on the key body. Further, the sheet body can be readily changed to another sheet body having a different design, enhancing the degree of a user's satisfaction.

DETAILED DESCRIPTION OF THE PREFERRED EMBODIMENTS

Figure 5A:
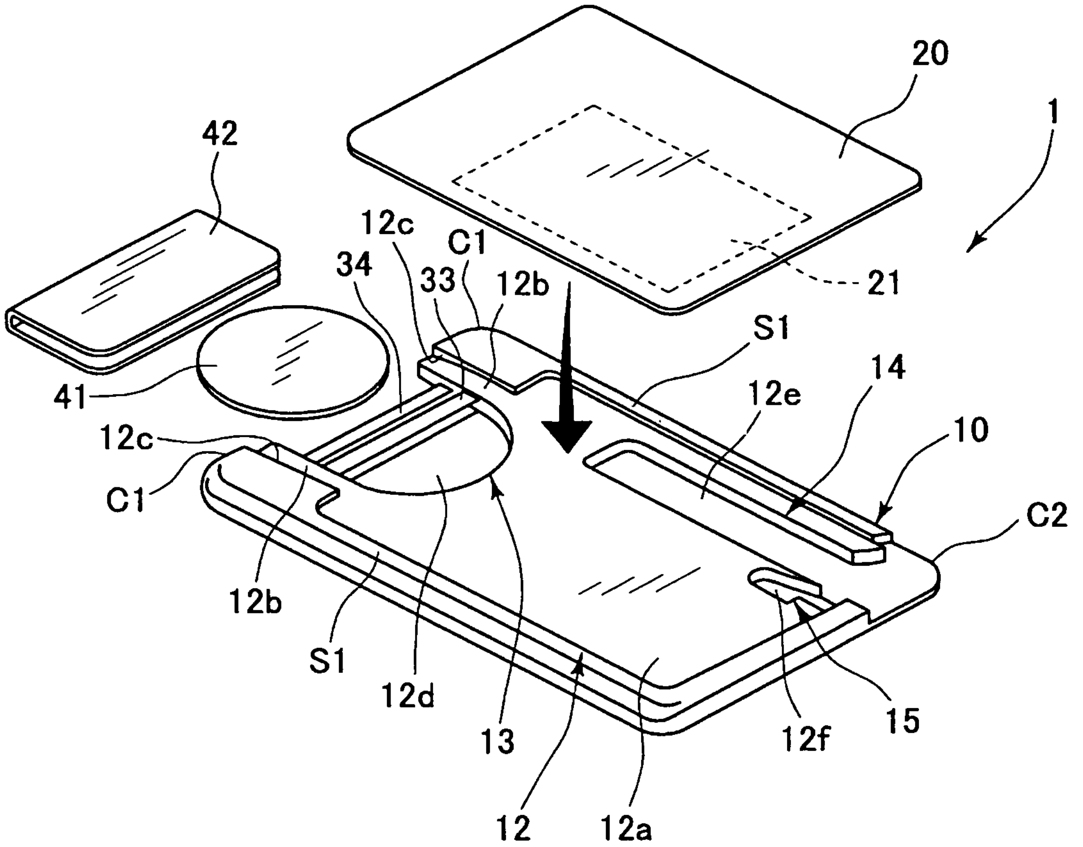
FIG. 5A is an exploded perspective view of a card key (excluding a mechanical key and a key fixing hook) to which a structure of a card key according to an embodiment of the present invention is applied.
Figure 5B:
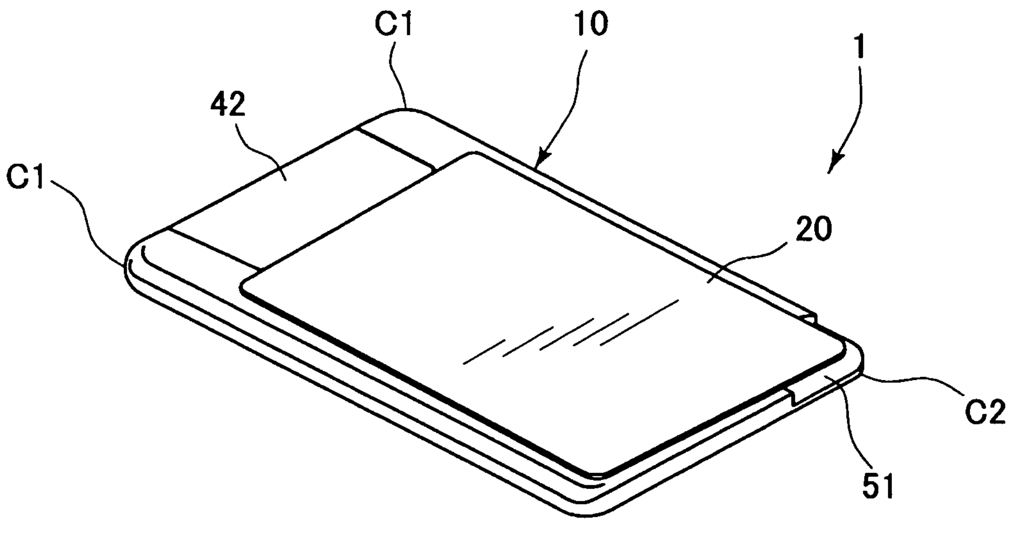
FIG. 5B is a perspective view illustrating a completed card key using the structure of the card key according to the embodiment.

With reference to FIGS. 5A and 5B as well as FIGS. 6 to 13, hereinafter is described a card key (i.e., a handheld electronic key having a shape of a credit card) according to an embodiment of the present invention.

FIGS. 5A and 5B as well as FIGS. 6 to 11 illustrate a card key 1 to which a structure of the card key of the present invention is applied. The card key 1 includes a key body 10 and a sheet body 20. The key body 10 is formed such that a circuit board 31 (see FIGS. 6, 7A and 7B) mounted with electronic parts 32 for performing radio communication with an on-vehicle device (not shown) is integrally covered with a resin material. The sheet body 20 is pasted onto a front surface (upper surface as viewed in FIG. 5A) of the key body 10 for integration with the key body 10.

The card key 1 is configured to provide a thin and substantially rectangular parallelepiped shape (shape of a thick credit card) being assembled with various parts (see FIG. 5B). The various parts include a button-shaped battery 41 that supplies electric power to the circuit board 31, a battery cover 42 that prevents the battery 41 from detaching, a manually operated mechanical key 51 (not for normal use) and a key fixing hook 52 (see FIGS. 6 and 10). The card key 1 contributes to realizing various functions available in the vehicle (including automatic locking and unlocking operation such as of vehicle doors, simple engine startup, and manual locking and unlocking operation such as of vehicle doors in the event the magnetomotive force of the battery 41 has lowered).

Figure 6:
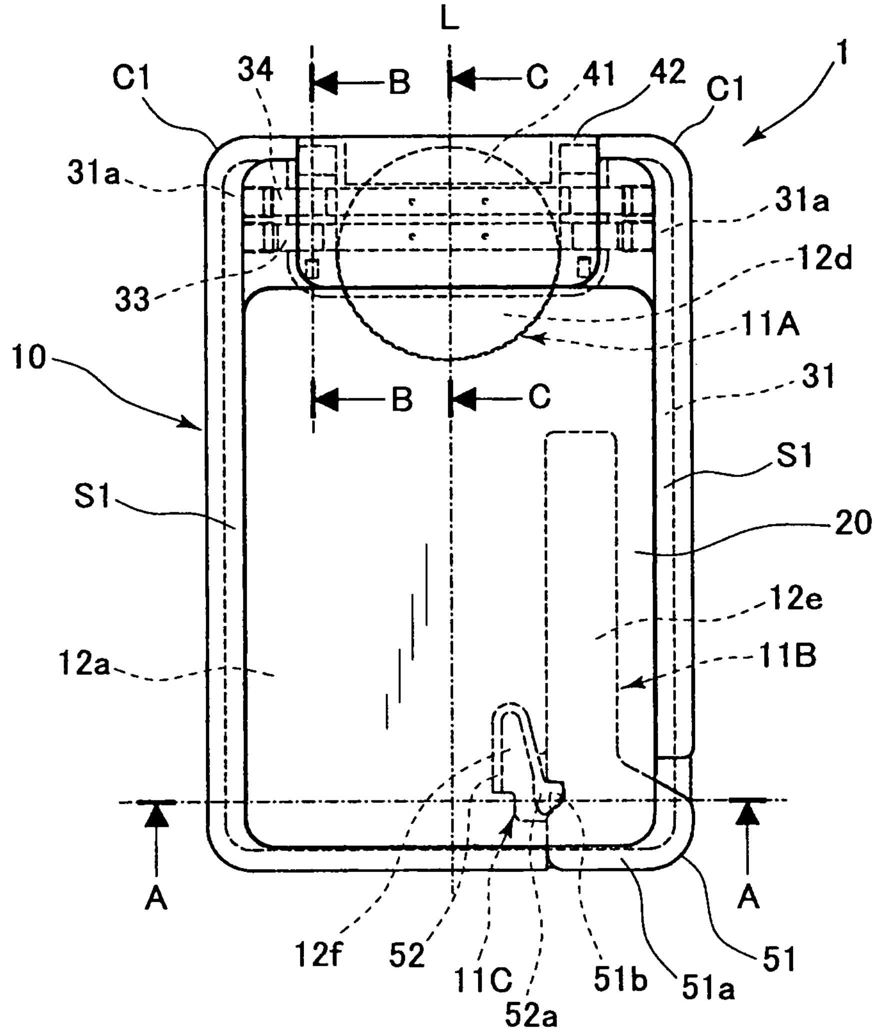
FIG. 6 is a plan view of the card key illustrated in FIG. 5B.
Figure 10:
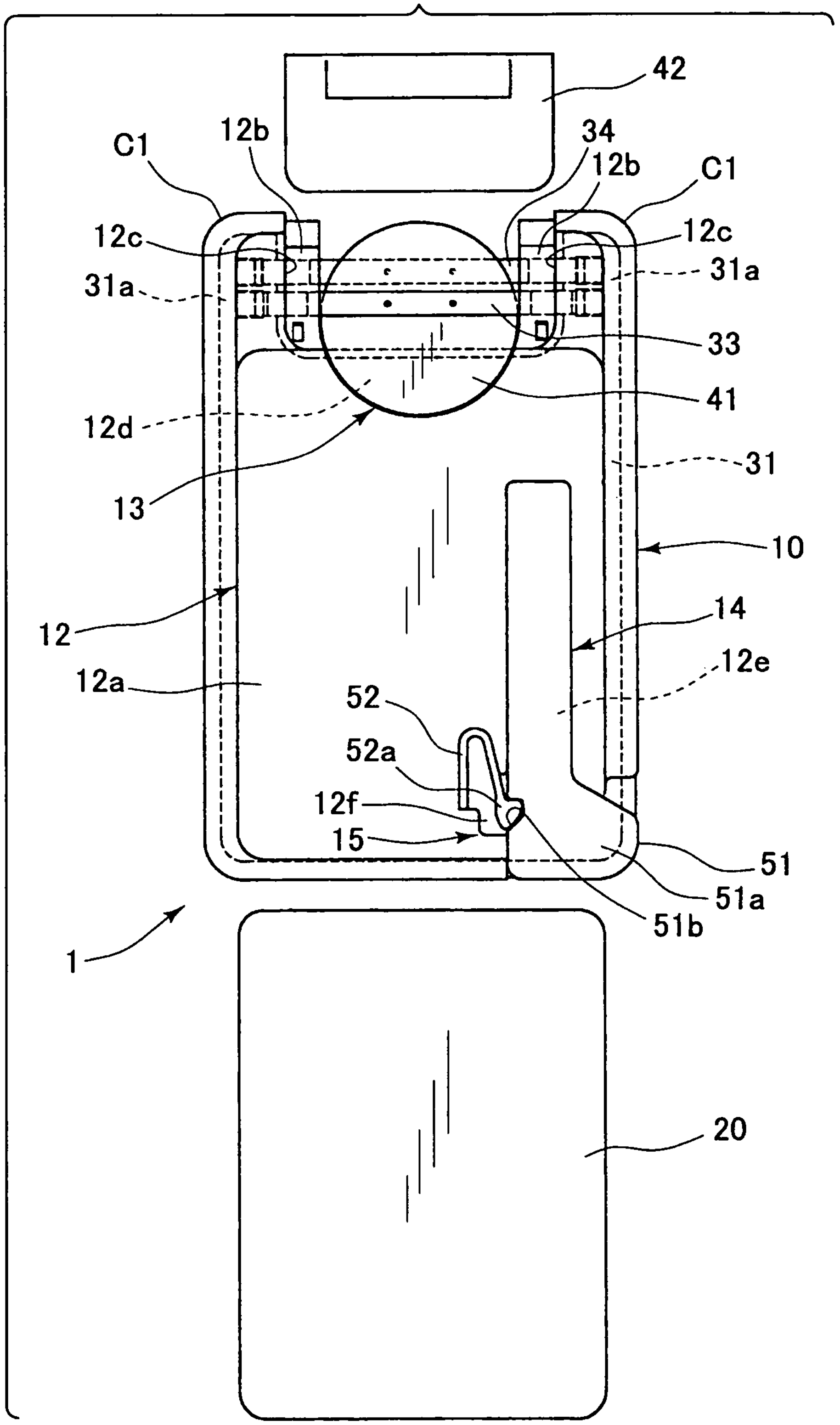
FIG. 10 is a plan view illustrating the card key illustrated in FIG. 6 but with a sheet body and a battery cover being removed.

As shown in FIGS. 6 and 10, the circuit board 31 is a substantially rectangular-shaped plate. One short side of the circuit board 31 has a mid portion which is cut off. The circuit board 31 has corners 31*a*, 31*a* sandwiching this cut-off portion and projecting parallel to a center line L that extends in the longitudinal direction of the circuit board 31. The circuit board 31 has a front surface (upper surface as viewed in FIG. 7B) on the side of which the electronic parts 32 are mounted, and a rear surface (lower surface as viewed in FIG. 7B) that is a non-mounted flat surface where no electronic parts 32 are mounted.

Figure 9A:
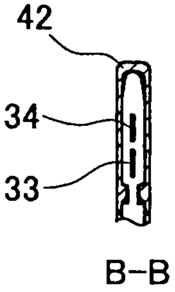
FIG. 9A is a cross-sectional view taken along a line B-B of FIG. 6.
Figure 9B:
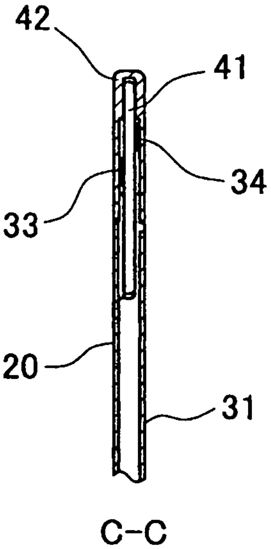
FIG. 9B is a cross-sectional view taken, along a line C-C of FIG. 6.

As shown in FIGS. 9A and 9B as well as FIG. 10, the corners 31*a*, 31*a* of the circuit board 31 are provided with battery terminals 33, 34 which are parallel to each other in a plan view and extending in a direction perpendicular to the center line L to bridge between the corners 31*a*, 31*a*. The battery terminals 33, 34 have the respective ends connected to (e.g., soldered onto) a wiring pattern on the circuit board 31. The battery terminal 33 is on a positive-pole side being in contact with the positive pole of the battery 41. The terminal 34 is on a negative-pole side being in contact with the negative pole of the battery 41. The battery terminals 33, 34 each have a bent form so that the respective intermediate portions are apart from each other by a length slightly smaller than the thickness of the battery 41.

The key body 10 is formed of a resin material, such as epoxy resin (EP), by using insert molding. Thus, as shown in FIGS. 5A and 5B as well as FIG. 10, the resin material forms corners C1, C1 of the key body 10 to cover the corners 31*a*, 31*a*, respectively, of the circuit board 31, with the intermediate portions of the battery terminals 33, 34 being exposed. The corners C1, C1 are opposed to each other so that the distance therebetween will be slightly larger than the outer diameter of the battery 41. The key body 10 has a principal front surface S1 (upper surface as viewed in FIG. 5A) in which a main body recess 12 is formed for mounting the sheet body 20 and the battery cover 42.

In the key body 1, the main body recess 12 is formed in the principal front surface S1, on the side of which the electronic parts 32 are mounted, sinking to a predetermined depth level. Specifically, the main body recess 12 is configured to have a bottom surface 12*a* for the sheet body 20 and a bottom surface 12*b* for the battery cover 42. The bottom surface 12*a* is positioned at a depth level from the principal front surface S1 of the key body 10, which corresponds to the thickness of the sheet body 20. The bottom surface 12*b* is positioned at a depth level from the principal front surface S1 of the key body 10, which corresponds to the thickness of the battery cover 42 (which is substantially the same as the thickness of the sheet body 20). Each of the corners C1, C1 of the key body 10 has a stepped shape with a step 12*c* being provided along the boundary between the principal front surface 51 and the bottom surface 12*b*. Thus, the battery cover 42 is ensured to be held by the bottom surface 12*b* and the steps 12*c* (see FIGS. 5A and 5B).

The key body 10 is also provided with a battery accommodating recess 13, a key accommodating recess 14 and a hook holding recess 15. These recesses are each formed so as to further sink with reference to the main body recess 12 and to have an opening in the bottom surface 12*a* of the main body recess 12.

The battery accommodating recess 13 has a bottom surface 12*d* confronting a portion of the battery 41 and positioned at a depth level from the bottom surface 12*a*, exceeding the thickness of the battery 41. Thus, a battery accommodating portion 11A is formed between the sheet body 20 covering for fixation the main body recess 12 and the bottom surface 12*d* of the battery accommodating recess 13. In other words, the battery accommodating portion 11A corresponds to a space defined by the bottom surface 12*d* and a plane extending from the bottom surface 12*a* of the main body recess 12 (see FIG. 6). The battery 41 is partially accommodated in the battery accommodating portion 11A in a state of being sandwiched between the battery terminals 33, 34, with the remaining part being located between the corners C1, C1.

The key accommodating recess 14 has a bottom surface 12*e* confronting the mechanical key 51 and positioned at a depth level from the bottom surface 12*a*, which corresponds to the thickness of the mechanical key 51. The hook accommodating recess 15 has a bottom surface 12*f* continuous to the bottom surface 12*e* of the key accommodating recess 14. The bottom surface 12*e* of the key accommodating portion 14 is located in the vicinity of one long side of the key body 10 so as to be parallel to the long side. Further, the bottom surface 12*e* extends along the longitudinal direction of the key body 10, which is a direction opposite to the corners C1, C1, and forms a corner C2.

The bottom surface 12*f* of the hook accommodating portion 15 confronts the key fixing hook 52, being located at a position near a short side on the side of the corner C2. The bottom surface 12*f* is continuous to the bottom surface 12*e* on the side opposite to the corner C2 with reference to the direction along which one short side of the key body 10 is provided. Thus, a key accommodating portion 11B is formed between the sheet body 20 covering for fixation the main body recess 12 and the bottom surface 12*e* of the key accommodating portion 14. In other words, the key accommodating portion 11B corresponds to a space defined by the bottom surface 12*e* and a plane extending from the bottom surface 12*a* of the main body recess 12. Further, a hook accommodating portion 11C is formed between the sheet body 20 and the bottom surface 12*f* of the hook accommodating recess 15. In other words, the hook accommodating recess 11C corresponds to a space defined by the bottom surface 12*f* and a plane extending from the bottom surface 12*a* of the main body recess 12 (see FIG. 6).

Figure 7A:
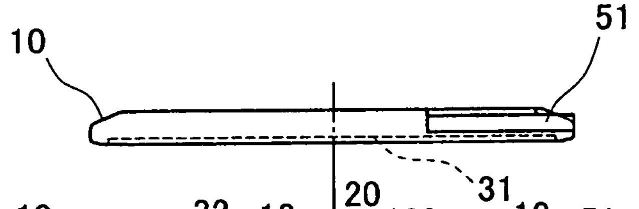
FIG. 7A is rear side view of the card key illustrated in FIG. 6.
Figure 7B:
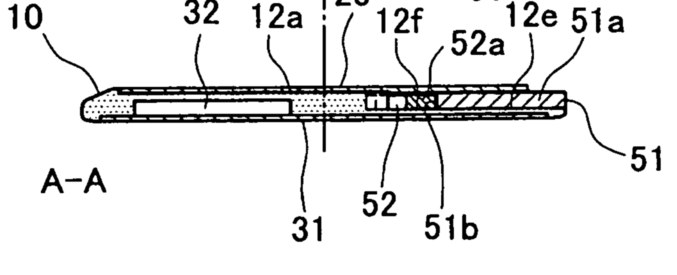
FIG. 7B is a cross sectional view taken along a line A-A of FIG. 6.
Figure 8:
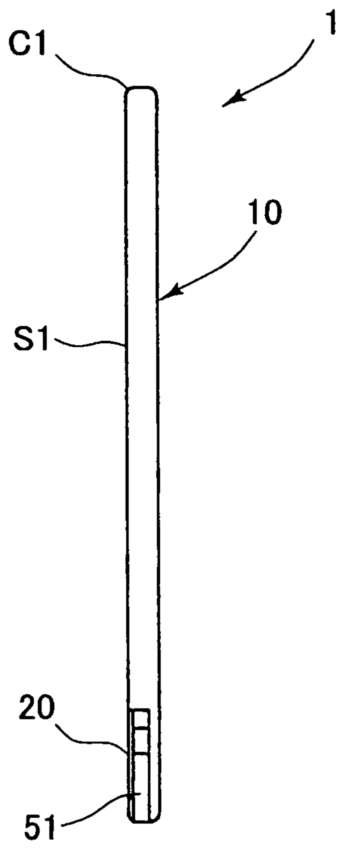
FIG. 8 is a right side view of the card key illustrated in FIG. 6.

The circuit board 31 is embedded at a depth level that would not permit the circuit board 31 to be exposed to any of the bottom surfaces 12*d*, 12*e* and 12*f* of the battery accommodating recess 13, the key accommodating recess 14 and the hook accommodating recess 15, respectively (see FIG. 7B). Meanwhile, the electronic parts 32 are embedded at a depth level that would not permit the electronic parts 32 to be exposed to the bottom surface 12*a* of the main body recess 12 (see FIG. 7B).

The battery accommodating recess 13, the key accommodating recess 14 and the hook accommodating recess 15 each correspond to the key component accommodating recess of the present invention. The battery accommodating portion 11A, the key accommodating portion 11B and the hook accommodating portion 11C each correspond to the key component accommodating portion of the present invention.

Figure 11:
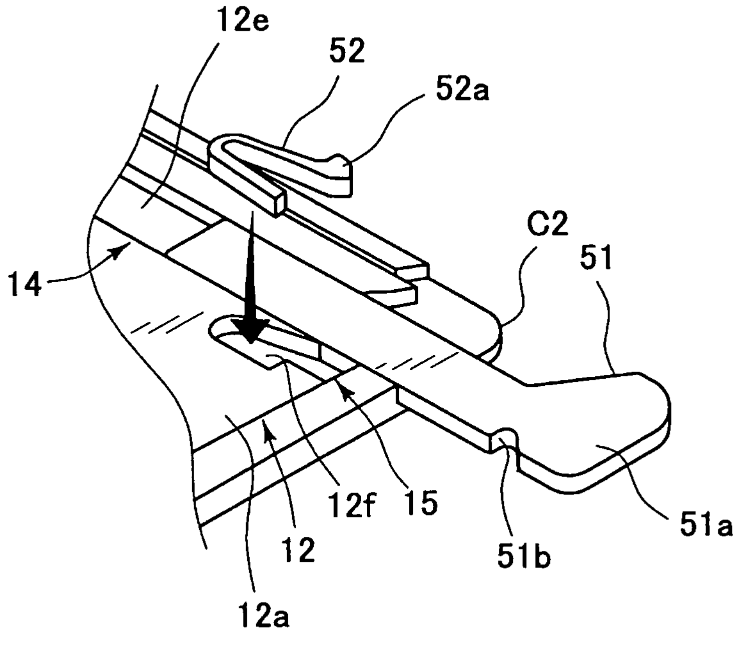
FIG. 11 is a partially enlarged view illustrating a mechanical key illustrated in FIG. 10.

The mechanical key 51, as schematically shown in FIGS. 10 and 11 (key groove and the like are omitted), is an L-shaped metal plate member formed such as by blanking which is used in press work. The mechanical key 51 is accommodated in the key accommodating recess 14 so as to be movable in the longitudinal direction of the card key 1. The mechanical key 51 is provided with a grip 51*a* having a back in which a notched engaged portion 51*b* is formed. Meanwhile, the key fixing hook 52 is provided with an engaging portion 52*a*. The engaged portion 51*b* of the mechanical key 51 is engaged with the engaging portion 52*a* of the key fixing hook 52. Thus, the mechanical key 51 is fixed to the key body 10 via the key fixing hook 52, thereby being prevented from coming off from inside the key accommodating recess 14.

The key fixing hook 52 is a substantially U-shaped resin product, such as of polyphenylene sulfide (PPS) or polyamide (PA). The key fixing hook 52 is elastically deformed depending on the position of the mechanical key 51 in the key accommodating recess 14. Specifically, in the state where the engaging portion 52*a* and the engaged portion 51*a* are in engagement, the key fixing hook 52 is slightly elastically deformed with the interval in the U shape being widened so that the shape of the hook resembles the original shape (state where the spring force caused by the elastic deformation is small). In the state where the engaging portion 52*a* and the engaged portion 51*a* are in disengagement, the key fixing hook 52 is greatly elastically deformed with the interval in the U shape being narrowed (state where the spring force caused by the elastic deformation is large). For example, the spring force may be controlled by changing, as appropriate, the 15, thickness or the height of the key fixing hook 52, and adding glass as a component of the material of the hook.

The sheet body 20 is made of a resin material, such as polycarbonate (PC), polyethlene terephthalate (PET), polypropylene (PP) and polystyrene (PS). The sheet body 20 has a front surface on which an inkjet accepting ink (mat ink), such as UV (ultraviolet) curable screen ink, is printed to enable inkjet printing by an inkjet printer. The mat ink printed on the surface of the sheet body 20 is not limited to the ink jet accepting ink. For example, the mat ink may be thermofusible transfer accepting ink or the like for enabling thermal transfer printing by a thermal transfer printer.

Figure 12:
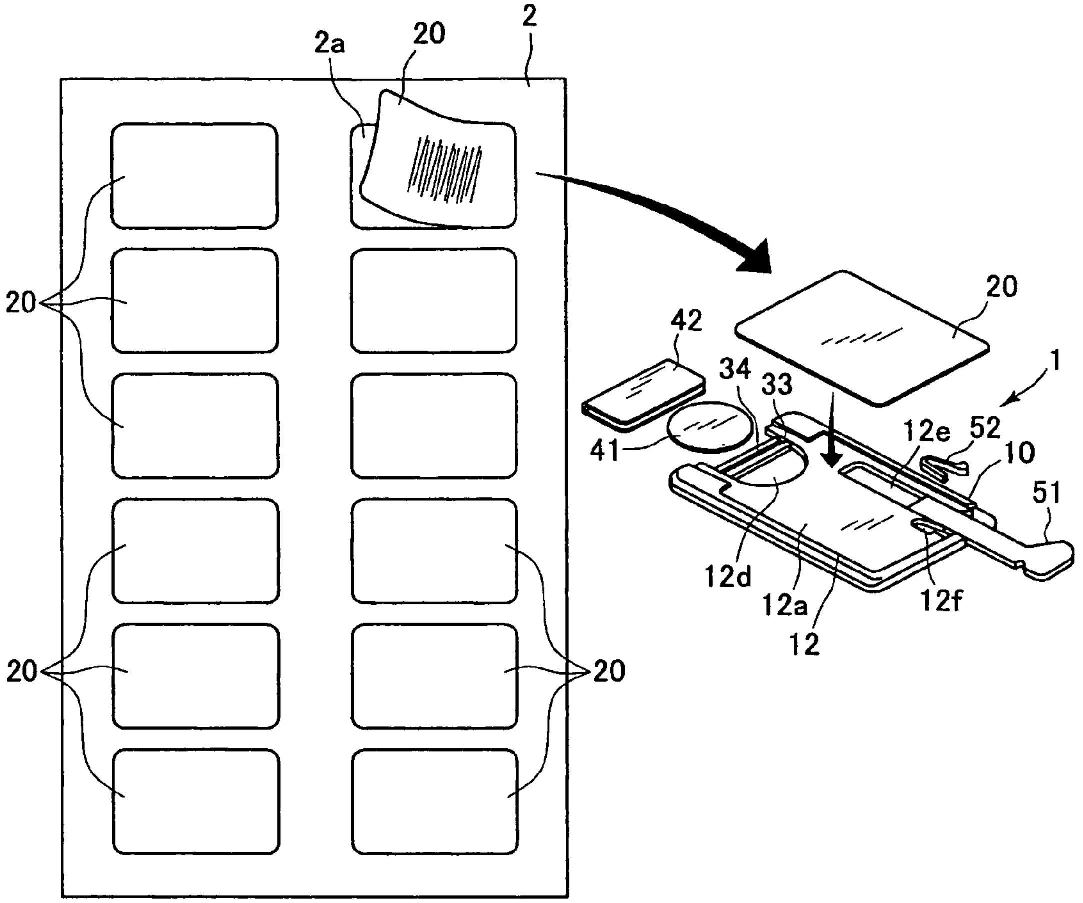
FIG. 12 is an explanatory view illustrating an example in which the sheet body illustrated in FIG. 5A is provided by a plural number on a printing sheet.

Specifically, as shown in FIG. 12, for example, a plurality of sheet bodies 20 are provided on a single printing sheet 2, which are used by being peeled off from a base paper 2*a*. It should be appreciated that the printing sheet 2 may favorably be prepared by a dealer selling the vehicle. The printing sheet 2 has a front surface on which the inkjet accepting ink is printed as mentioned above. Thus, an individual user is able to create an original design using a personal computer at home and print the design on each of the sheet bodies 20 using an inkjet printer.

The sheet body 20 is pasted onto the bottom surface 12*a* of the main body recess 12 via a double-faced adhesive tape 21 (e.g., product model No. 5000: manufactured by NITTO) having strong adhesiveness, which would not be peeled off in a normal usage state unless a force is applied thereto to intentionally peel off the sheet body 20.

The sheet body 20 is not limited to the type prepared by an individual user with the user's creation of a design and inkjet printing the design. For example, a dealer associated with the marketing of the vehicle may prepare and print various designs on a front or rear surface of a sheet body made of a transparent resin material. Alternatively, a sheet body may be prepared every time there is a request form a user.

Figure 13:
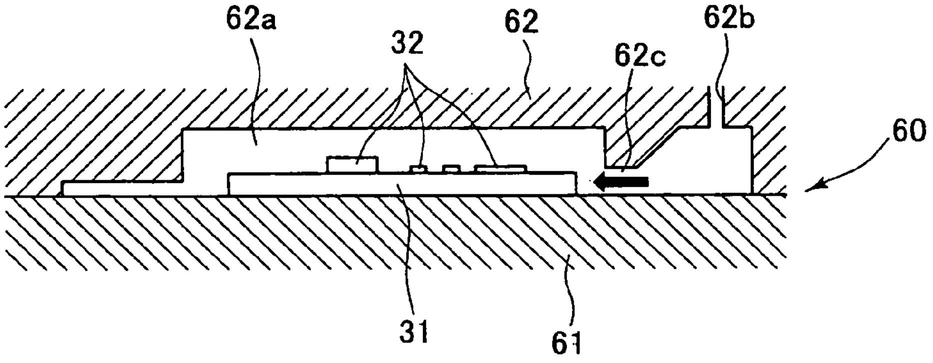
FIG. 13 is an explanatory view illustrating a die for molding a key body illustrated in FIG. 5A.

Hereinafter are described manufacturing steps of the key body 10. For example, as shown in FIG. 13, the key body 10 is manufactured by injection molding of a resin using a die 60 having a double-plate structure which is configured by a lower die 61 (core plate) and an upper die 62 (cavity plate). Specifically, the electronic parts 32 and the battery terminals 33, 34 are mounted in advance on the circuit board 31. Then, the rear surface of the circuit board 31 is hermetically arranged at a predetermined position on the front surface of the lower die 61 (circuit board arranging step).

The lower die 61, with the circuit board 31 being arranged, is moved upward as viewed in FIG. 13 (moved to a die-closing position, operation position) so as to be hermetically in contact with the upper die 62 (die-closing step). In this die-closed state, a cavity 62*a* corresponding to the main body recess 12, the battery accommodating recess 13, the key accommodating recess 14 or the hook accommodating recess 15 is formed in the upper die 62.

Then, a liquid epoxy resin is injected from an injection molding nozzle (not shown) through a sprue 62*b* and a gate 62*c* of the upper die 62 and filled in the cavity 62*a* (resin filling step). Then, the epoxy resin thus filled in is cured in the die 60 (resin curing step).

After the epoxy resin has been cured, the lower die 61 is moved downward as viewed in FIG. 13 (moved to a die-opening position, original position) (die-opening step). Thus, the key body 10 after completion of resin molding is taken out of the lower die 61 (product ejecting step). In this case, the key body 10 may be pushed out of the lower die 61 with the pushing motion of an ejector pin, simultaneously with the opening of the die.

As will be apparent from the description provided above, according to the card key 1 of the above embodiment, a main die 60 configured by the upper and lower dies 62 and 61 is used to form the battery accommodating recess 13, the key accommodating recess 14 and the hook accommodating recess 15 (key component accommodating recesses). Then, the side in which the accommodating recesses 13 to 15 are opened, i.e. the main body recess 12, is covered with the sheet body 20 to form the battery accommodating portion 11A, the key accommodating portion 11B and the hook accommodating portion 11C (key component accommodating portions) each having a closed cross section.

Thus, slide cores are eliminated from the die 60 and thus the manufacturing cost of the card key is reduced to a large degree. Moreover, since the sheet body 20 enables printing, a plurality of types of sheet bodies having different color and print (design) may be prepared. Accordingly, the sheet body 20 having a print of a user's favorite can be pasted onto the main body recess 12, realizing the card key 1 having individuality and unique to the user.

At the time of insert molding the key body 10, the battery accommodating recess 13 is formed in the key body 10. The battery accommodating recess 13 has the bottom surface 12*d* at a depth level deeper than the depth level of the bottom surface 12*a* of the main body recess 12. Thus, the battery accommodating recess 13 is also formed by the die-opening/closing motion of the die 60 consisting of the lower and upper dies 61 and 62. Accordingly, a slide core, for example, dedicated to the formation of the battery accommodating recess 13 is not required to be used. Thus, even when the battery accommodating recess 13 is to be formed, the labor of placing the circuit board 31 on the die 60 is simplified, whereby the manufacturing cost of the key body 10 is prevented from being increased.

At the time of insert molding the key body 10, the key accommodating recess 14 is formed in the key body 10. The key accommodating recess 14 has the bottom surface 12*e* at a depth level deeper than the depth level of the bottom surface 12*a* of the main body recess 12. Thus, similar to the battery accommodating recess 13, the key accommodating recess 14 is also formed by the die-opening/closing motion of the die 60 configured by the lower and upper dies 61 and 62. Accordingly, a slide core, for example, dedicated to the formation of the key accommodating recess 14 is not required to be used. Thus, even when the key accommodating recess 14 is to be formed, the labor of placing the circuit board 31 on the die 60 is simplified, whereby the manufacturing cost of the key body 10 is prevented from being increased.

Further, it is so configured that the key fixing hook 52 for fixing the mechanical key 51 to the key body 10 is provided outside the mechanical key 51. Accordingly, the shape of both of the mechanical key 51 and the key fixing hook 52 is simplified, whereby the manufacturing cost of the card key 1 as a whole is favorably prevented from being raised.

Figure 1:
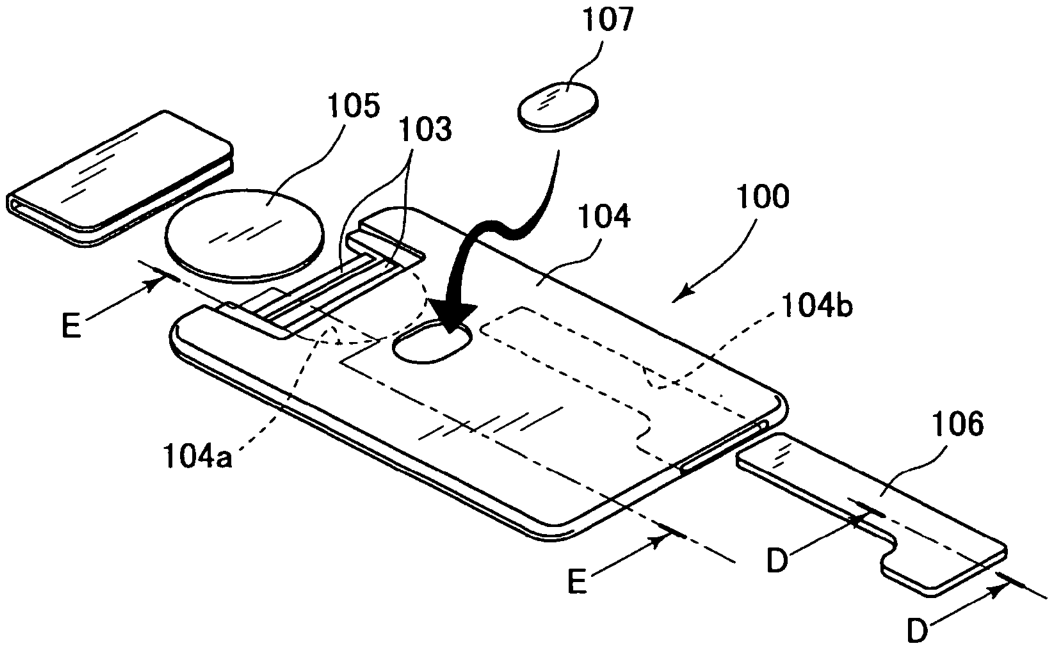
FIG.1 PRIOR ART
FIG. 1 is an exploded perspective view illustrating a card key based on an example of conventional art.
Figure 2:
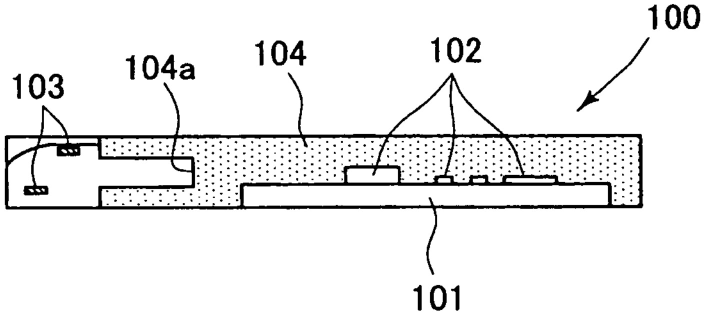
FIG.2 PRIOR ART
FIG. 2 is a cross-sectional view taken along a line E-E of FIG. 1.
Figure 3:
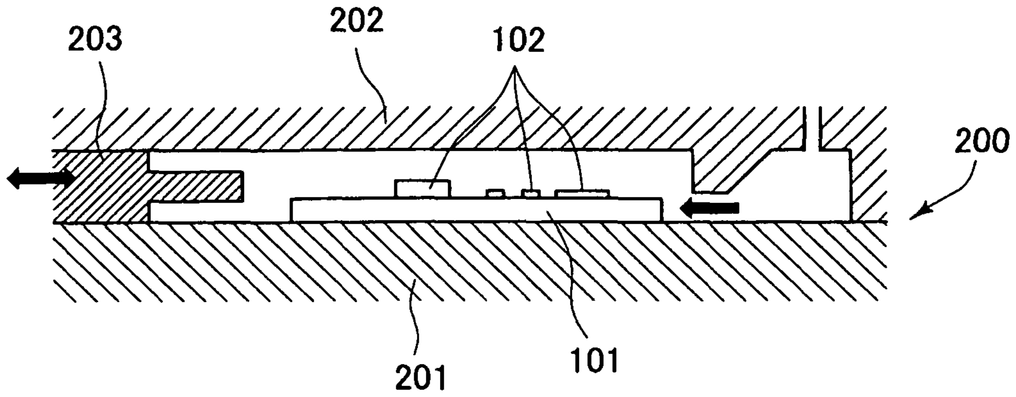
FIG.3 PRIOR ART
FIG. 3 is an explanatory view illustrating a die for forming a card key illustrated in FIG. 1.
Figure 4:
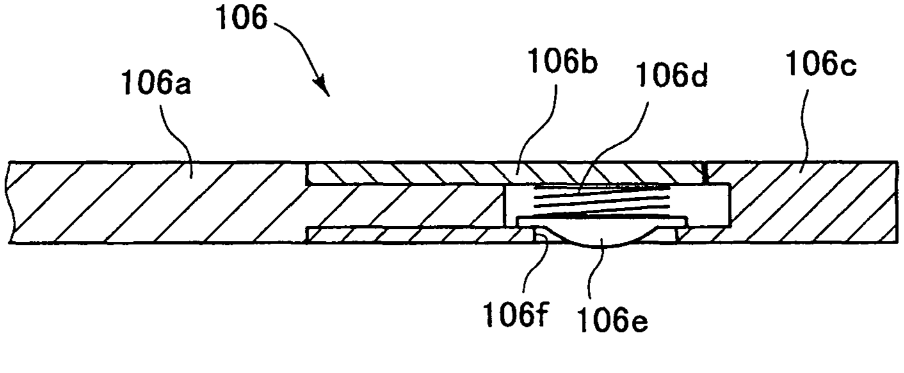
FIG.4 PRIOR ART
FIG. 4 is a cross-sectional view taken along a line D-D of FIG. 1.

In the conventional art, the mechanical key 106 is inserted into and pulled out of the key accommodating hole 104 of the card key 100. As shown in FIG. 4, for example, covers 106*b*, 106*c* are formed by welding or insert molding to sandwich a metal key body 106*a* in a thickness direction, which configures the mechanical key 106. At the same time, a coil spring 106*d* and a knob 106*e* are assembled between the covers 106*b*, 106*c*. Thus, the knob 106*e* is ensured to be constantly biased by the coil spring 106*d* and to be exposed outside through an opening 106*f* formed in the cover 106*c*. In other words, the mechanical key 106 and the card key 100 are held by the spring force of the coil spring 106*d* via the knob 106*e*.

Such a conventional configuration increases the number of parts of the mechanical key 106 and, being coupled with the necessity of forming the coil spring 106*d* and the knob 106*e* into a very small size, makes it more difficult to reduce the cost of the card key 100. In this regard, in the configuration of the above embodiment, the key fixing hook 52 is accommodated in the hook accommodating portion 11C. Thus, the problems of the conventional art are favorably eliminated.

Further, an inkjet accepting ink that enables inkjet printing is printed on the front surface of the sheet body 20. Thus, a design unique to the user is provided by inkjet printing. Alternatively, it is so configured that a design prepared in advance is printed on the front or rear surface of the sheet body 20. Thus, a user's favorite design is introduced to the user's card key, raising the degree of satisfaction of the user.

The sheet body 20 is configured to be pasted, through its rear surface, to the bottom surface 12*a* of the main body recess 12 via the double-faced adhesive tape 21. This may facilitate the work of mounting the sheet body 20 on the key body 10 and also facilitate the change of the sheet body 20 with another sheet body 20 having a different design, more favorably raising the degree of satisfaction of the user.

The embodiment described above has been configured to form the battery accommodating recess 13, the key accommodating recess 14 and the hook accommodating recess 15 as the key component accommodating recesses. However, not all of these accommodating recesses 13 to 15 are required to be formed, but at least one of these accommodating recesses 13 to 15 may be formed. Thus, eliminating the use of respective slide cores (bushes), the cost incurred in manufacturing the key body 10 is suppressed from being increased.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A card key, comprising:

a plate-shaped key body which is mounted with a circuit board being covered with a resin material, the circuit board being mounted with electronic parts that configure an electronic circuit for performing radio communication with an on-vehicle device; and a sheet body having an exterior appearance different from the resin material and being suitable for a card user to personalize the appearance of the card by removably fitting the sheet body to a main body recess of the key body to a main body recess of the key body; wherein the key body has a principal front surface on a side of which the electronic parts are mounted, the key body being provided with a main body recess sinking to a predetermined depth level from the principal front surface, and a key component accommodating recess further sinking to a level deeper than the main body recess and opened in a bottom surface of the main body recess;

the key body forms an outline of the card key together with the sheet body fitted to the main body recess for coverage of the main body recess, wherein an inkjet accepting mat or a thermofusible transfer accepting mat that enables inkjet printing or thermofusible transfer printing is coated on the front surface of the sheet body;

the sheet body and the key component accommodating recess are formed to provide a key component accommodating portion therebetween, the key component accommodating portion having a closed cross section and accommodating a key component therein, the circuit board is embedded in the resin material at a depth level that avoids the circuit board from being exposed to a bottom surface of the key component accommodating recess; and the electronic parts are embedded in the resin material at a depth level that avoids the electronic parts from being exposed to a bottom surface of the main body recess.

2. The card key according to claim 1, wherein the key component accommodating recess is a battery accommodating recess that accommodates a battery for supplying electric power to the circuit board; and the card key further comprising a battery accommodating portion between the sheet body and the battery accommodating recess to restrict movement of the battery in a thickness direction of the key body.

3. The card key according to claim 2, wherein the key component accommodating recess is a key accommodating recess that accommodates a manually operated mechanical key; and the card key further comprising a key accommodating portion between the sheet body and the key accommodating recess to restrict movement of the mechanical key in a thickness direction of the key body.

4. The card key according to claim 3, wherein the key body is provided with a hook accommodating recess for accommodating a key fixing hook which fixes the mechanical key to the key body by being engaged with an engaged portion formed in the mechanical key, the hook accommodating recess being formed further sinking to a depth level deeper than that of the main body recess, and being opened in a bottom surface of the main body recess; and the card key further comprising a hook accommodating portion between the sheet body and the hook accommodating recess to restrict movement of the key fixing hook in a thickness direction of the key body.

5. The card key according to claim 4, wherein the key accommodating recess and the hook accommodating recess have respective bottom surfaces located so as to be flush with a surface of the mechanical key;

the key fixing hook has a substantially U-shaped form and is located on a bottom surface of the hook accommodating recess, the key fixing hook being elastically deformed in a direction parallel to the bottom surface of the hook accommodating recess so that an interval in the U shape is narrowed in a state where the key fixing hook is disengaged from the engaged portion, compared to a state where the key fixing hook is engaged with the engaged portion.

6. The card key according to claim 1, wherein the key component accommodating recess is a key accommodating recess that accommodates a manually operated mechanical key; and the card key further comprising a key accommodating portion between the sheet body and the key accommodating recess to restrict movement of the mechanical key in a thickness direction of the key body.

7. The card key according to claim 6, wherein the key body is provided with a hook accommodating recess for accommodating a key fixing hook which fixes the mechanical key to the key body by being engaged with an engaged portion formed in the mechanical key, the hook accommodating recess being formed further sinking to a depth level deeper than that of the main body recess, and being opened in a bottom surface of the main body recess; and the card key further comprising a hook accommodating portion between the sheet body and the hook accommodating recess to restrict movement of the key fixing hook in a thickness direction of the key body.

8. The card key according to claim 7, wherein the key accommodating recess and the hook accommodating recess have respective bottom surfaces located so as to be continuous at a depth level corresponding to the thickness of the mechanical key; and the key fixing hook has a substantially U-shaped form and is located on a bottom surface of the hook accommodating recess, the key fixing hook being elastically deformed in a direction parallel to the bottom surface of the hook accommodating recess so that an interval in the U shape is narrowed in a state where the key fixing hook is disengaged from the engaged portion, compared to a state where the key fixing hook is engaged with the engaged portion.

9. A card key, comprising:

a plate-shaped key body which is mounted with a circuit board being covered with a resin material, the circuit board being mounted with electronic parts that configure an electronic circuit for performing radio communication with an on-vehicle device; and a sheet body having an exterior appearance different from the resin material and being suitable for a card user to personalize the appearance of the card by removably fitting the sheet body to a main body recess of the key body to a main body recess of the key body, wherein the key body has a principal front surface on a side of which the electronic parts are mounted, the key body being provided with a main body recess sinking to a predetermined depth level from the principal front surface, and a key component accommodating recess further sinking to a level deeper than the main body recess and opened in a bottom surface of the main body recess;

the key body forms an outline of the card key together with the sheet body fitted to the main body recess for coverage of the main body recess, wherein the sheet body has a front surface or a rear surface on which a certain design is printed in advance;

the sheet body and the key component accommodating recess are formed to provide a key component accommodating portion therebetween, the key component accommodating portion having a closed cross section and accommodating a key component therein, the circuit board is embedded in the resin material at a depth level that avoids the circuit board from being exposed to a bottom surface of the key component accommodating recess; and the electronic parts are embedded in the resin material at a depth level that avoids the electronic parts from being exposed to a bottom surface of the main body recess.

10. A card key, comprising:

a plate-shaped key body which is mounted with a circuit board being covered with a resin material, the circuit board being mounted with electronic parts that configure an electronic circuit for performing radio communication with an on-vehicle device; and a sheet body having an exterior appearance different from the resin material and being suitable for a card user to personalize the appearance of the card by removably fitting the sheet body to a main body recess of the key body to a main body recess of the key body, wherein the key body has a principal front surface on a side of which the electronic parts are mounted, the key body being provided with a main body recess sinking to a predetermined depth level from the principal front surface, and a key component accommodating recess further sinking to a level deeper than the main body recess and opened in a bottom surface of the main body recess;

the key body forms an outline of the card key together with the sheet body fitted to the main body recess for coverage of the main body recess, wherein the sheet body is configured to be pasted through a rear surface thereof onto a bottom surface of the main body recess via an adhesive;

the sheet body and the key component accommodating recess are formed to provide a key component accommodating portion therebetween, the key component accommodating portion having a closed cross section and accommodating a key component therein, the circuit board is embedded in the resin material at a depth level that avoids the circuit board from being exposed to a bottom surface of the key component accommodating recess; and the electronic parts are embedded in the resin material at a depth level that avoids the electronic parts from being exposed to a bottom surface of the main body recess.

11. A card key according to claim 10, wherein the sheet body has a front surface that enables printing on the front surface.

12. A card key according to claim 10, wherein the sheet body has a front surface or a rear surface on which a certain design is printed in advance.

13. A card key, comprising:

a plate-shaped key body which is mounted with a circuit board being covered with a resin material, the circuit board being mounted with electronic parts that configure an electronic circuit for performing radio communication with an on-vehicle device; and a sheet body having an exterior appearance different from the resin material and being suitable for a card user to personalize the appearance of the card by removably fitting the sheet body to a main body recess of the key body to a main body recess of the key body, wherein the key body has a principal front surface on a side of which the electronic parts are mounted, the key body being provided with a main body recess sinking to a predetermined depth level from the principal front surface, and a key component accommodating recess further sinking to a level deeper than the main body recess and opened in a bottom surface of the main body recess;

the key body forms an outline of the card key together with the sheet body fitted to the main body recess for coverage of the main body recess, wherein the sheet body has a front surface that enables printing on the front surface;

the sheet body and the key component accommodating recess are formed to provide a key component accommodating portion therebetween, the key component accommodating portion having a closed cross section and accommodating a key component therein, the circuit board is embedded in the resin material at a depth level that avoids the circuit board from being exposed to a bottom surface of the key component accommodating recess; and the electronic parts are embedded in the resin material at a depth level that avoids the electronic parts from being exposed to a bottom surface of the main body recess.

* * * * *